Nov. 9, 1965                J. H. BREMS                3,216,641
            METHOD AND APPARATUS FOR CONTOUR WELDING
                    Filed March 3, 1960
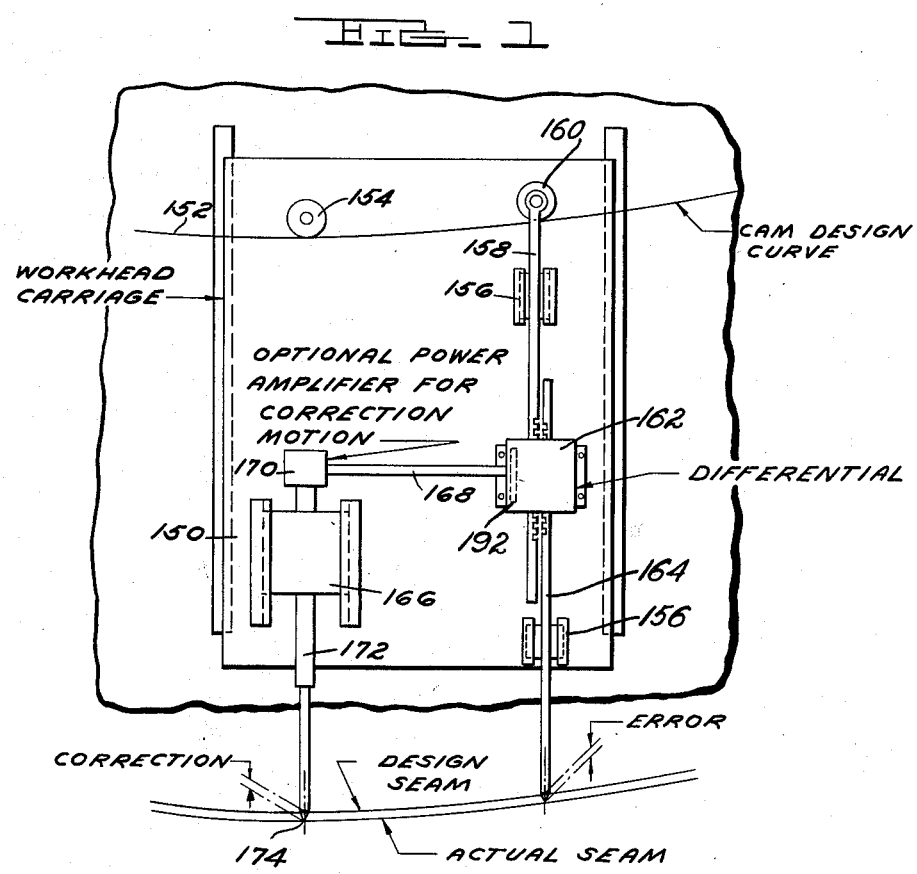
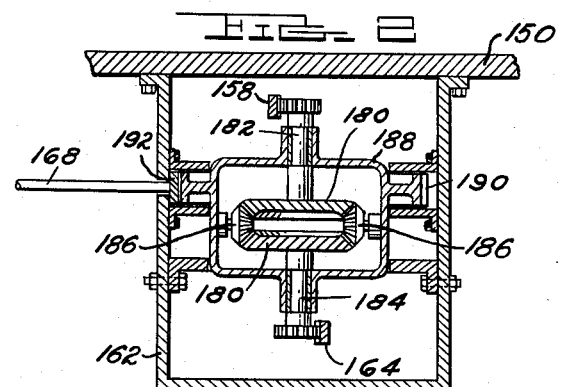
INVENTOR.
JOHN H. BREMS
BY
Barnes, Kisselle, Raisch & Choate
ATTORNEYS

United States Patent Office 3,216,641
Patented Nov. 9, 1965

3,216,641
METHOD AND APPARATUS FOR
CONTOUR WELDING
John H. Brems, Southfield, Mich., assignor to Motomation, Inc., Detroit, Mich., a corporation of Michigan
Filed Mar. 3, 1960, Ser. No. 12,523
6 Claims. (Cl. 228—7)

This patent disclosure is directed to a welding machine. It relates particularly to a machine for controlling a work head to follow a meandering course with sufficient accuracy to insure a good weld between adjoining parts.

Many manufacturing operations, including a welding operation, involve following a curved line with a reasonable degree of accuracy. In addition the line, as planned for production, may vary from the plan due to manufacturing tolerances. This is especially true where forming operations are involve such as bending of heavy pieces. For example, an automobile frame piece has irregular curvatures which are accurately planned but the edge of a completed frame may vary materially from this plan because of inaccurate cutting of the original stock and discrepancies which develop in the forming operations.

The present disclosure is directed to a tracing head mechanism which will follow a defined contour as planned and which will compensate for any errors which have developed in the manufacture of the particular part. While the device may be adapted to other manufacturing operations than welding, it is described herein particularly in connection with a welding head which is movable in a path along a part.

An object of the invention is the provision of a device to accomplish the purpose outline in the most economical manner.

It is an object of the present invention to provide a mechanism for responding to errors between a design curve and an actual curve so that a correction motion can be imparted to a work head such as a welding head to follow as nearly as possible the actual work line of the part. Briefly, this is accomplished by moving a probe along the actual seam and directing the motion of that probe to a differential along with the motor of a similar probe which is following the curve design. The output from the differential is reflected in the motion of a direct head which moves up or down in a substantial accord with the work probe.

Drawings accompany the disclosure and a brief description of the various views thereof is as follows:

FIGURE 1, a diagrammatic illustration of the apparatus.

FIGURE 2, a diagrammatic presentation of a common differential to be used.

Referring to the drawings:

Reference is made to applicant's copending application Serial No. 12,522, filed March 3, 1960, now Patent No. 3,158,121, dated November 24, 1964, wherein a similar device including a memory delay system is disclosed.

A traveling panel 150, suitably mounted for vertical motion, moves horizontally along a cam design curve 152 by reason of rollers 154. Mounted in a slide 156 on the panel 150 is a follower bar 158 having a roller 160 also riding on the cam design curve. This follower bar 158 feeds into a differential shown diagrammatically at 162 and a similar follower bar or probe 164 feeds into the differential 162. The algebraic sum of the motion of the two bars 158 and 164 is reflected in the motion of the output bar 168 connected to a welding head 166.

This differential consists of a pair of side gears 180 operated by the input shafts 182 and 184 driven by follower bar 158 and the probe 164 respectively. Side gears 180 are meshed with pinion gears 186 on spider frame 188 which carries a ring gear 190. Acting on a rack output bar 192 associated with arm 168. Other differential mechanisms can be used such as a linkage differential.

Interposed between the head 166 and the bar 168 is an optional power amplifier 170 for response to motion of the bar 168 if desired. This can be any kind of a mechanical hydraulic or electrical follow-up responsive proportionately to the motion of the bar 168. Depending from the head 160 is the welding unit 172 which contacts the work at 174.

In the operation of the device if the actual seam as shown in the drawing is below the design seam, the probe will be dropped down below the design seam the amount of the error as shown. This will cause a drop in the sectional bar 164 of differential 162 and a corresponding drop in bar 168 which drops the welding unit 172 to the actual seam. If the actual seam were above the design seam, the opposite motion would take place. The purpose of course, in having the bar 158 following the design curve is to eliminate that amount of motion which would be necessary to cover the entire meandering of the work of the design curve. The differential gives the algebraic sum the motions to shift the work head accordingly.

To define the operation in greater detail, it will be understood that the traveling panel 150, supported for horizontal and vertical motion, moves along the actual cam design curve by reason of the support of the roller 154. Roller 160 on the input shaft 158 follows this design curve. The end of the input shaft 164 serves as a probe in mechanical contact with the actual seam to be welded. If these two parts 158 and 164 move in exact synchronism, there is no motion of the differential. If, however, there is a relative motion between these parts because of a discrepancy between the actual work line and the cam design curve, then the two side gears 180 of the differential will reflect this difference and impart it to the pinions 186 which will transfer it to the rotating housing 188 and the external ring gear 190. This will cause a longitudinal motion of the rack 190 and a corresponding motion of the arm 168, thus causing a raising or lowering of the welding unit 172 to correspond to the discrepancy.

It will be understood that due to the spacing between the probe 164 and the welding unit 172, there will be a slight discrepancy in the response, but this is a calculated error in the system.

I claim:

1. The method of controlling the path of a work part which comprises, moving a panel in a general direction parallel to the desired contour to be followed by the work part, providing on said panel a differential mechanism having an output shaft connected to a work head and placing the input shafts of said differential into actual contact, one with the desired work line and one with the actual work line, wherein the direct response of the output of the differential will move the work head in a path along the actual work line followed by one of said input shafts.

2. The method of controlling the path of a work part along a contoured workpiece which comprises, the step of moving the work part in a general direction of work to be done, sensing the actual contour of the workpiece, sensing the planned contour of the workpiece, utilizing the algebraic difference between the said contours to shift the work part directly transversely of the contour to maintain it in contact with the actual control of the workpiece as sensed.

3. A device for controlling the path of a work part which comprises, a mounting plate mounted to move along a work path, a double probe on said plate, one to follow the planned design contour and the other to follow the actual contour of the work, a differential mechanism, means associating said probes with said differential mechanism as the input motions to said differential, an output shaft for said differential, and means connecting a follower tool to said output shaft to cause differential motion of said follower tool in direct response to movement of said output shaft of the differential due to the algebraic sum of the motion of said probes as they follow the contours.

4. A device for controlling the path of a welding head which comprises a panel mounted for horizontal and vertical motion along an actual work path, a probe on said panel adapted to follow an actual work path, a probe on said panel adapted to follow a theoretical work path, a mechanical differential between said probes responsive to differences in the motion of said probes, an output bar on said mechanical differential to reflect the differences in the motions of said probes, a welding head, and means connecting said welding head and said output bar to position said welding head along said actual work path in direct response to motion of said output bar of said differential as the probes follow the actual and theoretical work paths.

5. A device as defined in claim 4 in which said differential comprises a pair of side gears connected by pinions rotatably mounted in a differential housing having an external ring gear, said probes being associated with rack bars and pinions directly connected to said side gears, a longitudinally translatable rack bar meshed with said external ring gear, said rack bar being connected to said differential output bar to control said weld head.

6. A control apparatus for a work part such as a welding head to move said part along an actual curved path in relation to a theoretical path, comprising a mounting panel movable horizontally and vertically parallel to a theoretical work path and generally along the actual path of the work, a work head slidably carried by said panel having a projecting portion to act on said work, a first probe on said panel slidably carried by said panel for motion parallel to said work head, a second probe slidably carried by said panel for motion parallel to said first probe and said work head, said first probe being positioned to contact the actual contour of said work, said second probe being positioned to contact the theoretical path of said work, a differential mechanism, having two input gears and one output gear, means connecting said probes to the respective input gears of said differential, and means connecting said output gear to said work head to move the work head in direct response to movement of the output gear of the differential whereby a discrepancy between the actual path of said work and the theoretical path of said work will be reflected in, and compensated for, by said differential to keep said work head in contact with the actual work path.

References Cited by the Examiner
UNITED STATES PATENTS
2,089,029   8/37   Jones _____ 113—124 X FOREIGN PATENTS
797,020   6/58   Great Britain.
1,114,501   12/55   France.

WHITMORE A. WILTZ, *Primary Examiner.*

NEDWIN BERGER, JOHN F. CAMPBELL, CHARLES W. LANHAM, *Examiners.*